3,135,752
PROCESS FOR PRODUCING
BIPHTHALYLBIIMIDES
Ellis K. Fields, Chicago, Ill., assignor to Standard Oil
Company, Chicago, Ill., a corporation of Indiana
No Drawing. Filed Aug. 3, 1962, Ser. No. 214,483
8 Claims. (Cl. 260—250)

This invention relates to organo-nitrogen compounds. More particularly, it relates to biphthalylbiimides as new compositions and to their preparation.

It has been discovered that when diphthalimides are heated in the present of a triester of phosphorous acid, a novel cyclization reaction occurs, with the formation of biphthalylbiimides containing an unsaturated six-member heterocyclic ring.

The novel biphthalylbiimides of this invention are represented by the formula

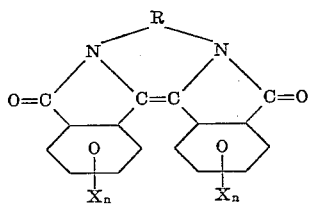

wherein R is a divalent organic radical of at least two carbon atoms having two vicinal carbon atoms separately attached to the nitrogen atoms, X is a substituent of the group consisting of alkyl, aryl, aralkyl, alkaryl, alkoxy, aryloxy, and carbalkoxy radicals containing from 1 to about 20 carbon atoms, chlorine and bromine; and $n$ is from 0 to 4.

These new compounds are prepared by heating the corresponding diphthalimide having the formula

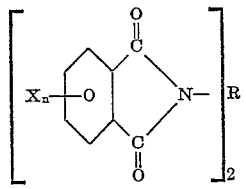

wherein R, X and $n$ are as defined above, in an organic phosphite having the formula $(R_1O)_3P$ wherein $R_1$ is a radical of the group consisting of phenyl and $C_{1-8}$ alkyl radicals, at a temperature of from about 100 to about 300° C. for a period of time of from about 1 to about 500 hours.

The diphthalimides are prepared in the conventional manner from phthalic anhydride and a diamine having the formula $$H_2N—R—NH_2$$

wherein R is defined above.

The diamines suitable for use in preparing the diphthalimides reactants for conversion to the biphthalylbiimides of this invention are the primary diamines wherein the primary amino groups are attached on vicinal carbons, that is adjacent carbons, present in the structure of aliphatic, cycloaliphatic and aromatic diamines. The primary diamines must contain at least 2 carbon atoms so as to furnish 2 vicinal carbons. Illustrative examples of the aliphatic and cycloaliphatic primary diamines are ethylene diamine, 1,2-propane diamine, 1,2-diamino-isobutane, ethene diamine, diamino acetylene, 1,2-diamino-propene, 1,2-diamino-cyclohexane. Illustrative of the aromatic diamines are phenylethylene diamine (alpha-beta-diamino-ethylbenzene), 4-methyl-1,2-naphthylene diamine, 5-methyl-1,2-naphthylene diamine, 7-methyl-1,2-naphthylene diamine, 1,2-naphthylene diamine, 9,10-diamino-phenanthrene, 2,3-diamino-phenazine, 2,3-diamino pyridine, 3,4-diamino-pyridine, 3,4-diamino-triphenylmethane, 3,4-diamino-ortho-xylene, 4,5-diamino-ortho-xylene, 4,5-diamino-meta-xylene, 2,3-diamino-para-xylene, 2,3-naphthylene damine. It is, of course, understood that in addition to the compounds named herein, that any diamine compound that has two primary amino groups attached to vicinal carbon atoms, whether such vicinal carbon atoms are part of an aliphatic chain or of an aromatic ring, is suitable for the preparation of the diphthalimides for use in this invention. The preferred diamines are ethylene diamine, ortho-phenylene diamine, 1,2-naphthylene diamine and ortho-naphthylene diamine. Such diamino compounds can also contain other substituents that are inert to the various reactions involved in preparing the biphthalylbiimides of this invention.

It is thus apparent that R in the above formulae is the residue of the diamino compounds that furnish vicinal carbon atoms in the preparation of the diphthalimides. For example, R is the ethylene radical —CH$_2$CH$_2$— when ethylene diamine is the primary amino compound. When ortho-phenylene diamine is used as the diamino reactant in the preparation of the diphthalimides, R thus becomes the ortho-phenylene radical in the formulae. Similarly, when ortho-naphthylenes are used, R becomes the ortho-naphthylene radical. The phthalic anhydride reactant used in preparing the diphthalimides can be unsubstituted phthalic anhydride, or can contain 1 to 4 substituents, which substituents are represented by X in the above formulae. The substituents represented by X can be organic radicals containing from 1 to about 20 carbon atoms. Such organic radicals can be alkyl, aryl, aralkyl, alkaryl, alkoxy, aryloxy, or carbalkoxy radicals. Also the benzene nuclear phthalic anhydride may be substituted with 1 to 4 chlorine or bromine atoms or mixtures thereof. The number of substituents that can be present on the phthalic anhydride nucleus is represented by $n$, which stands for an integer of 0 to 4. Thus, when $n$ is 0, the phthalic anhydride is unsubstituted. The symbol as used in the specification and claims

represents the benzene nucleus of phthalic anhydride; and the symbol

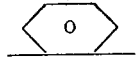

represents the ortho-phenylene radical.

The triesters of phosphorus acid, that are used as the reaction medium or solvent for effecting the cyclization of the diphthalimides to the biphthalylbiimides of this invention, are the organic phosphites having the formula $(R_1O)_3P$ wherein $R_1$ is a radical of the group consisting of phenyl and $C_{1-8}$ alkyl radicals. Such organic phosphites are referred to as trialkyl phosphites or triphenyl phosphites. The trialkyl phosphites suitable as the reaction medium are trimethyl phosphite, triethyl phosphite, tripropyl phosphite, tributyl phosphite, trihexyl phosphite, tricyclohexyl phosphite, triheptyl phosphite, trioctyl phosphite. The preferred phosphites are the trimethyl and triethyl phosphites. The amount of phosphite that is used is in excess of the amount of diphthalimide so as to provide sufficient liquidity for the diphthalimide reactant.

Temperatures between about 100 and 300° C. can be employed in the practice of this invention. The preferred temperatures are the reflux temperatures of the phosphites used as the reaction medium. Although atmospheric pressure is usually employed, the cyclization reaction can be effected at either sub- or super-atmospheric pressures. The reaction period, being dependent upon temperature, is from 1 to about 500 hours.

The cyclization reaction for the conversion of the diphthalimides to biphthalylbiimides is simply effected by admixing the diphthalimides with an excess of the trialkyl or triphenyl phosphite and heating the mixture under reflux conditions for a period of time sufficient to complete the cyclization.

Illustrative embodiments of the invention are:

*Example 1*

N,N'-ethylene diphthalimide

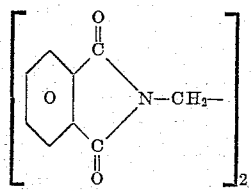

was prepared by reacting 6.7 ml. (0.1 mole) ethylene diamine (anhydrous) with 29.64 g. (0.2 mole) phthalic anhydride in 125 ml. diethylene glycol dimethyl ether at 160° C. for 20 minutes, cooling to 70° C., adding 200 ml. 95% ethanol, and filtering. The product was recrystallized from alcohol, giving 20 g. (60 mole percent) white crystals melting at 234–6° C. A. Bistzycki and W. Schmutz, Ann. 415, 22 (1918) give 232–3° C. as the melting point.

A mixture of 2.7 g. N,N'-ethylene diphthalimide and 100 ml. triethyl phosphite was refluxed 240 hours at 143–165° C. The solution was cooled, the solid collected on a filter, and washed thoroughly with acetone, giving 1.1 g. (90 mole percent) purple N,N'-ethylene biphthalylbiimide,

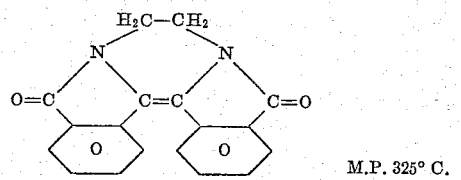

M.P. 325° C.

*Analysis.*—Calculated for $C_{18}H_{12}N_2O_2$: C, 75.0; H, 4.2; N, 7.2. Found: C, 74.8; H, 4.6; N, 7.5.

The new compound is slightly soluble in organic solvents and imparts a strong yellow-blue fluorescence to its solutions. From the acetone washings 1.33 g. N,N'-ethylene diphthalimide was recovered by evaporation.

*Example 2*

N,N'-o-phenylene diphthalimide

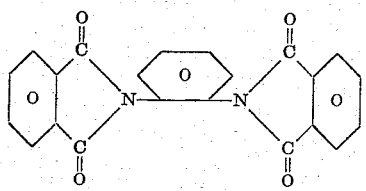

obtained according to Lieb, Monatshefte 39, 882, by melting 2 moles phthalic anhydride with 1 mole o-phenylene diamine at 170–200° C. and recrystallizing from boiling acetic acid. Lieb gives 296° C. as the melting point.

A mixture of 7.28 g. (0.02 mole) N,N'-o-phenylene diphthalimide and 150 ml. triethyl phosphite was refluxed for 120 hours, cooled, and filtered, giving a mixture of large yellow and red crystals. This was easily separated mechanically, giving 3.6 g. yellow starting material and 2.35 g. (70 mole percent) red N,N'-o-phenylene biphthalylbiimide

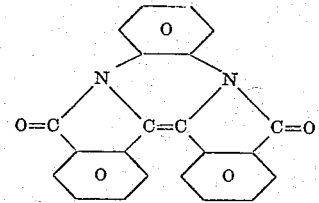

melting at 275° C. after crystallization from cyclohexane.

*Analysis.*—Calculated for $C_{22}H_{12}N_2O_2$: N, 8.3%. Found: 7.9%.

Yields expressed in Examples 1 and 2 are based upon unrecovered starting materials.

*Example 3*

N,N'-ethylene di-(t-butyl phthalimide) was prepared by adding 6.7 ml. (0.1 mole) anhydrous ethylene diamine to a solution of 40.8 g. (0.2 mole) t-butyl phthalic anhydride in 30 ml. diglyme at 120° C. The mixture became hot and the temperature climbed to 160° C. spontaneously. Heating was continued at 120° C. for 15 minutes, the solution was cooled to 60° C., diluted with 100 ml. methanol, chilled to 5° C., and filtered. The solid weighed 35 g.; 8 g. more resulted from evaporation of the filtrate. Total yield was quantitative. Crystallized from n-heptane, the N,N'-ethylene di-(t-butyl phthalimide)

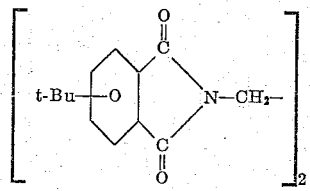

*Analysis.*—Calculated for $C_{26}H_{28}O_4N_2$: C, 72.2; H, 6.5; N, 6.5. Found: C, 72.3; H, 6.4; N, 6.4.

A solution of 8.64 g. (0.02 mole) N,N'-ethylene di-(t-butyl phthalimide) in 100 ml. triethyl phosphite was refluxed for 456 hours. The cooled solution deposited yellow crystals of N,N'-ethylene bi-(t-butylphthalyl)-biimide,

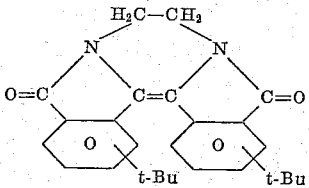

5.1 g. (64 mole percent) after washing with methanol. The product was a mixture of isomers and was separated by extraction with boiling xylene. The less-soluble isomer melted at 370° C., the more-soluble melted at 315–320° C. Both isomers had the identical IR spectrum. Analysis for the 370° C. melting isomer—

Calculated for $C_{26}H_{28}N_2O_2$: C, 78.0; H, 7.0; N, 7.0. Found: C, 78.1; H, 7.0; N, 6.9.

It was appreciably soluble in organic solvents and mineral oil, giving strongly red-blue fluorescent solutions.

To a solution of 0.05 g. of the biimide of this example in 10 g. dioctyl isophthalate was added 10 g. polyvinyl chloride. The mixture was heated at 120–125° C. until a clear melt resulted. A portion of this clear melt was cast in a thin layer, which on cooling formed a clear, transparent, tough, flexible film having a green-blue fluorescence. Another portion of the clear melt was heated to 160° C. for 10 seconds and which, after casting in a thin layer and cooling, gave a clear, transparent, tough, flexible film having a red-blue fluorescence.

As indicated above, the biphthalylbiimides of this invention are extremely useful as soluble dyes in organic materials, such as in hydrocarbon oils, solvents and synthetic resins. These biimides are also useful as pigments.

It will be apparent to one skilled in the art upon reading the description of this invention that many variations can be effected. For example, it is possible to form tetra-phthalyl-tetra-imides from tetraphthal-tetra-imides prepared from phthalic anhydride and 1,2,4,5-tetraamino benzene.

Thus having described the invention, what is claimed is:

1. The method of preparing biphthalylbiimides of the formula

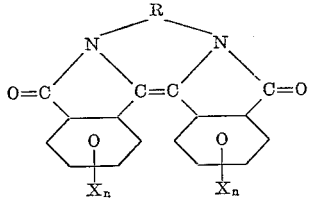

wherein R is a divalent organic radical of at least two carbon atoms having two vicinal carbon atoms thereof separately attached to the nitrogen atoms, X is a substituent of the group consisting of alkyl, aryl, aralkyl, alkaryl, alkoxy, aryloxy, and carb-alkoxy radicals containing from 1 to about 20 carbon atoms, chlorine and bromine; and $n$ is from 0 to 4, which comprises heating a diphthalimide having the formula

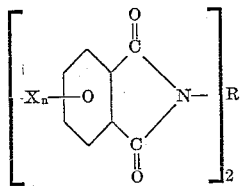

wherein R, X and $n$ are as defined above, in an organic phosphite having the formula $(R_1O)_3P$ where $R_1$ is a radical of the group consisting of phenyl and $C_{1-8}$ alkyl radicals, at a temperature of from about 100 to about 300° C. for a period of time of from about 1 to about 500 hours.

2. The method of claim 1 wherein R is the divalent ethylene radical.
3. The method of claim 1 wherein R is the divalent orthophenylene radical.
4. The method of claim 1 wherein said phosphite is triethyl phosphite.
5. The method of claim 1 wherein R is the divalent ethylene radical, $n$ is 0 and said phosphite is triethyl phosphite.
6. The method of claim 1 wherein R is the divalent orthophenylene radical, $n$ is 0, and said phosphite is triethyl phosphite.
7. The method of claim 1 wherein R is the divalent ethylene radical, X is the tert-butyl radical, $n$ is 1 and said phosphite is triethyl phosphite.
8. The compound N,N'-o-phenylene biphthalylbiimide having the formula:

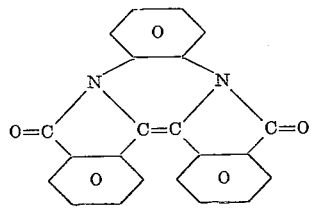

References Cited in the file of this patent

Bistrzycki et al.: J. Chem. Soc., London, vol. 114, part 1 (1918), pages 452–454.